United States Patent
Macglashan

(10) Patent No.: US 11,816,591 B2
(45) Date of Patent: Nov. 14, 2023

(54) REINFORCEMENT LEARNING THROUGH A DOUBLE ACTOR CRITIC ALGORITHM

(71) Applicants: Sony Corporation, Tokyo (JP); Sony Corporation of America, New York, NY (US)

(72) Inventor: James Macglashan, Riverside, RI (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 478 days.

(21) Appl. No.: 16/800,463

(22) Filed: Feb. 25, 2020

(65) Prior Publication Data
US 2020/0302323 A1    Sep. 24, 2020

Related U.S. Application Data

(60) Provisional application No. 62/821,243, filed on Mar. 20, 2019.

(51) Int. Cl.
   *G06N 20/00*  (2019.01)
   *G06N 7/01*  (2023.01)

(52) U.S. Cl.
   CPC .............. *G06N 7/01* (2023.01); *G06N 20/00* (2019.01)

(58) Field of Classification Search
   CPC .......... G06N 3/006; G06N 5/04; G06N 20/00; G06V 10/82; A63F 13/67
   See application file for complete search history.

(56) References Cited

U.S. PATENT DOCUMENTS

| | | | |
|---|---|---|---|
| 2004/0073764 A1 | 4/2004 | Andreasson | |
| 2007/0203871 A1 | 8/2007 | Tesauro et al. | |
| 2009/0012922 A1* | 1/2009 | Tesauro | G06N 3/006 706/12 |
| 2015/0100530 A1* | 4/2015 | Mnih | A63F 13/67 706/25 |
| 2015/0227837 A1* | 8/2015 | Clifton | G05B 23/0243 706/52 |

(Continued)

FOREIGN PATENT DOCUMENTS

| | | |
|---|---|---|
| JP | 2018003124 | 1/2018 |
| JP | 2018525759 A | 9/2018 |

(Continued)

OTHER PUBLICATIONS

Dylan Alexander Simon, Model-Based Reinforcement Learning in Humans: Computations, Limitations, and Trade-Offs (Sep. 2012) Department of Psychology New York University p. 1-14 (Year: 2012).*

(Continued)

*Primary Examiner* — Saba Dagnew
(74) *Attorney, Agent, or Firm* — INNOVATION CAPITAL LAW GROUP, LLP; Vic Lin

(57) ABSTRACT

The Double Actor Critic (DAC) reinforcement-learning algorithm affords stable policy improvement and aggressive neural-net optimization without catastrophic overfitting of the policy. DAC trains models using an arbitrary history of data in both offline and online learning and can be used to smoothly improve on an existing policy learned or defined by some other means. Finally, DAC can optimize reinforcement learning problems with discrete and continuous action spaces.

20 Claims, 1 Drawing Sheet

(56) References Cited

U.S. PATENT DOCUMENTS

| | | | | |
|---|---|---|---|---|
| 2019/0258938 A1* | 8/2019 | Mnih | ...................... | G06N 3/045 |
| 2019/0378042 A1* | 12/2019 | Tuzi | ....................... | G06N 20/00 |
| 2020/0143206 A1* | 5/2020 | Kartal | ....................... | G06N 5/01 |

FOREIGN PATENT DOCUMENTS

| | | | |
|---|---|---|---|
| JP | 2019124990 A | 7/2019 | |
| WO | 2017019555 A1 | 2/2017 | |
| WO | WO-2018083671 A1 | 5/2018 | |
| WO | 2018224471 A1 | 12/2018 | |
| WO | 2019002465 A1 | 1/2019 | |

OTHER PUBLICATIONS

Perttu Hamalainen et al: "PPO-CMA: Proximal Policy Optimization with Covariance Matrix Adaptation", arxiv.org, Cornell University Library, 201 Olin Library Cornell University Ithaca, NY 14853,Oct. 5, 2018, XP081433389.

Trapit Bansal et al: "Emergent Complexity via Multi-Agent Competition", arxiv.org, Cornell University Library, 201 Olin Library Cornell University Ithaca, NY 14853,Oct. 10, 2017, XP081310233.

International Search Report dated May 28, 2020 from PCT Application No. PCT/US2020/019652.

* cited by examiner

REINFORCEMENT LEARNING THROUGH A DOUBLE ACTOR CRITIC ALGORITHM

CROSS-REFERENCE TO RELATED APPLICATIONS

This application claims the benefit of priority to U.S. provisional patent application No. 62/821,243, filed Mar. 20, 2019, the contents of which are herein incorporated by reference.

BACKGROUND OF THE INVENTION

1. Field of the Invention

Embodiments of the invention relates generally to machine learning systems and methods. More particularly, the invention relates to systems and methods for using a double actor critic algorithm for reinforcement learning for a device, such as an intelligent artificial agent.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

No existing actor-critic algorithm supports a number of important properties for industrial use cases, including those discussed below that are addressed by embodiments of the present invention. Most conventional algorithms require very strict sets of data that are produced using decisions from the most recent version of the actor model. Other conventional algorithms require explicit knowledge of how decisions were made (e.g., the decision probability from the system that generated the data). Some conventional algorithms only support discrete or continuous action domains, rather than both. Many approaches lack mechanisms to avoid catastrophic overfitting. Some conventional methods introduce terms into their objective functions that limit integration with other learning paradigms or background knowledge. Finally, no existing system uses both stale actor and critic models in both objectives for stable policy iteration.

In view of the foregoing, it is clear that there is a need for an algorithm that can meet some or all of the deficiencies of the conventional methods.

SUMMARY OF THE INVENTION

Double Actor Critic (DAC) satisfies a number of important properties for industrial use cases, including the following: (1) DAC can operate on historical data that was collected following any arbitrary policy; (2) DAC does not require any special knowledge about how the observed decisions in the data were made; (3) DAC provides support for discrete-action problems and continuous-action problems; (4) DAC performs aggressive policy optimization without catastrophic over-fitting to limited data; (5) DAC can integrate with other policy learning paradigms or background knowledge, such as learning from demonstration; and (6) DAC provides stable iteration, avoiding fitting errors due to noisy cross-objective model changes.

For example, DAC may be used to solve a discrete-action HVAC control problem in which the decisions concern whether to turn on or off different heating and cooling systems based on measurements of temperature in different regions, time of day, number of people in the area, etc. DAC may also be used to solve continuous-action control problems like how to control a robotic arm and manipulator to pick and place objects based on images from its camera and the position of its joints.

Embodiments of the present invention provide a reinforcement learning algorithm for an agent, the algorithm comprising using an action-value model for training a policy model, the action-value model estimating, within one or more processors of the agent, an expected future discounted reward that would be received if a hypothetical action was selected under a current observation of the agent and the agent's behavior was followed thereafter; and maintaining a stale copy of both the action-value model and the policy model, wherein the stale copy is initialized identically to the fresh copy and is slowly moved to match the fresh copy as learning updates are performed on the fresh copy, wherein the algorithm has both an offline variant, in which the algorithm is trained using previously collected data, and an online variant, in which data is collected as the algorithm trains the policy model.

Embodiments of the present invention further provide a method of training a policy model and an action-value model of an agent, comprising estimating, within one or more processors of the agent by the action-value model, an expected future discounted reward that would be received if a hypothetical action was selected by the agent under a current observation of the agent and the agent's behavior was followed thereafter, the expected future discounted reward, Q, determined by $$Q(s,a) = E[\Sigma_{t=1}^{\infty} \gamma^{t-1} r_t | s, a, \pi],$$

where $r_t$ is a reward received at timestep t, s is the current observation of an environment state, a is the hypothetical action, $\pi$ is the policy model, and $\gamma$ is a discount factor in a domain [0, 1) that defines how valued future rewards are to more immediate rewards; and maintaining a stale copy of both the action-value model and the policy model, wherein the stale copy is initialized identically to the fresh copy and is moved step-wise to match the fresh copy as learning updates are performed on the fresh copy, wherein the algorithm has both an offline variant, in which the algorithm is trained using previously collected data, and an online variant, in which data is collected as the algorithm trains the policy model; the stale copy of the policy model acts as an old policy to be evaluated by the fresh copy of the action-value model critic; and the stale copy of the action-value model provides Q-values of an earlier policy model on which a fresh policy model improves.

Embodiments of the present invention also provide a non-transitory computer-readable storage medium with an executable program stored thereon, wherein the program instructs one or more processors to perform the following steps (1) using an action-value model for training a policy model, the action-value model estimating, within one or more processors of the agent, an expected future discounted reward that would be received if a hypothetical action was selected under a current observation of the agent and the agent's behavior was followed thereafter; and (2) maintaining a stale copy of both the action-value model and the policy model, wherein the stale copy is initialized identically to the fresh copy and is slowly moved to match the fresh copy as learning updates are performed on the fresh copy, wherein the algorithm has both an offline variant, in which the algorithm is trained using previously collected data, and an online variant, in which data is collected as the algorithm trains the policy model.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Figures 1, 2:
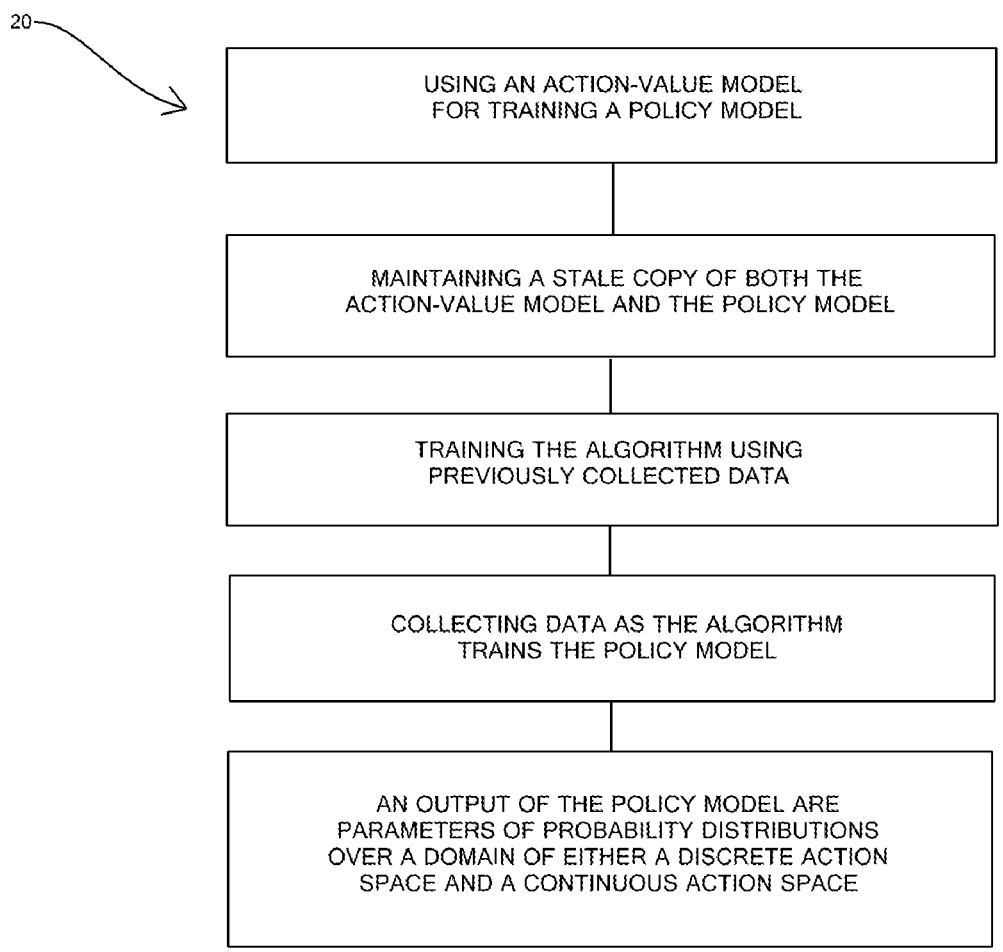
FIG. 1 illustrates a block diagram of an artificial intelligent agent operable to perform methods and algorithms according to embodiments of the present invention.
FIG. 2 illustrates general method steps for a double-actor critic algorithm according to an exemplary embodiment of the present invention.

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

A "computer" or "computing device" may refer to one or more apparatus and/or one or more systems that are capable of accepting a structured input, processing the structured input according to prescribed rules, and producing results of the processing as output. Examples of a computer or computing device may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units. "Software" or "application" may refer to prescribed rules to operate a computer.

Examples of software or applications may include code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Python, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code may also be distributed among a plurality of computational units wherein each unit processes a portion of the total computation.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically, a processor (e.g., a microprocessor) will receive instructions from a memory or like device, and execute those instructions, thereby performing a process defined by those instructions. Further, programs that implement such methods and algorithms may be stored and transmitted using a variety of known media.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random-access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASHEEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G, 4G, 5G and the like.

Embodiments of the present invention may include apparatuses for performing the operations disclosed herein. An apparatus may be specially constructed for the desired purposes, or it may comprise a general-purpose device selectively activated or reconfigured by a program stored in the device.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory or may be communicated to an external device so as to cause physical changes or actuation of the external device.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

The term "agent" or "intelligent agent" or "artificial agent" or "artificial intelligent agent" is meant to refer to any man-made entity that chooses actions in response to observations. "Agent" may refer without limitation to a robot, to a simulated robot, to a software agent or "bot", an adaptive agent, an internet or web bot.

The term "robot" may refer to any system controlled directly or indirectly by a computer or computing system that issues actions or commands in response to senses or observations. The term may refer without limitation to a traditional physical robot with physical sensors such as cameras, touch sensors, range sensors, and the like, or to a simulated robot that exists in a virtual simulation, or to a "bot" such as a mailbot or searchbot that exists as software in a network. It may without limitation refer to any limbed robots, walking robots, industrial robots (including but not limited to robots used for automation of assembly, painting, repair, maintenance, etc.), wheeled robots, vacuum-cleaning or lawn-mowing robots, personal assistant robots, service robots, medical or surgical robots, flying robots, driving robots, aircraft or spacecraft robots, or any other robots, vehicular or otherwise, real or simulated, operating under substantially autonomous control, including also stationary robots such as intelligent household or workplace appliances.

The terms "observation" or "observations" refers to any information the agent receives by any means about the agent's environment or itself In some embodiments, that information may be sensory information or signals received through sensory devices, such as without limitation cameras, touch sensors, range sensors, temperature sensors, wavelength sensors, sound or speech sensors, position sensors, pressure or force sensors, velocity or acceleration or other motion sensors, location sensors (e.g., GPS), etc. In other embodiments that information could also include without limitation compiled, abstract, or situational information compiled from a collection of sensory devices combined with stored information. In a non-limiting example, the agent may receive as observation abstract information regarding the location or characteristics of itself or other objects. In some embodiments this information may refer to people or customers, or to their characteristics, such as purchasing habits, personal contact information, personal preferences, etc. In some embodiments, observations may be information about internal parts of the agent, such as without limitation proprioceptive information or other information regarding the agent's current or past actions, information about the agent's internal state, or information already computed or processed by the agent.

The term "action" refers to the agent's any means for controlling, affecting, or influencing the agent's environment, the agent's physical or simulated self or the agent's internal functioning which may eventually control or influence the agent's future actions, action selections, or action preferences. In many embodiments the actions may directly control a physical or simulated servo or actuator. In some embodiments the actions may be the expression of a preference or set of preferences meant ultimately to influence the agent's choices. In some embodiments, information about agent's action(s) may include, without limitation, a probability distribution over agent's action(s), and/or outgoing information meant to influence the agent's ultimate choice of action.

The term "state" or "state information" refers to any collection of information regarding the state of the environment or agent, which may include, without limitation, information about the agent's current and/or past observations.

The term "policy" refers to any function or mapping from any full or partial state information to any action information. Policies may be hard coded or may be modified, adapted or trained with any appropriate learning or teaching method, including, without limitation, any reinforcement-learning method or control optimization method. A policy may be an explicit mapping or may be an implicit mapping, such as without limitation one that may result from optimizing a particular measure, value, or function. A policy may include associated additional information, features, or characteristics, such as, without limitation, starting conditions (or probabilities) that reflect under what conditions the policy may begin or continue, termination conditions (or probabilities) reflecting under what conditions the policy may terminate.

Broadly, embodiments of the present invention provide a DAC reinforcement-learning algorithm that affords stable policy improvement and aggressive neural-net optimization without catastrophic overfitting of the policy. The DAC algorithm trains models using an arbitrary history of data in both offline and online learning and can be used to smoothly improve on an existing policy learned or defined by some other means. Finally, the DAC algorithm can optimize reinforcement learning problems with discrete and continuous action spaces.

Referring to FIG. 1, an intelligent agent 10 is shown schematically as having one or more processors 12, memory 14 and sensors 16 for obtaining observation data. Of course, other sensors and components may be included in the agent 10, as may be understood present in conventional intelligent agents known in the art. The representation provided in FIG. 1 is for schematic purposes only and should not be construed as limiting the features of the agent. The agent 10 can perform the method 20 as shown in FIG. 2. Additional details of the method of FIG. 2 are described in the below specification and claims.

At a high level, the algorithmic implementation of DAC at a high-level can be used for both the discrete and continuous action cases using neural-network model implementations. Additionally, DAC can be used to improve on an existing actor model that may have been hard-coded or trained by some other means.

Although DAC is primarily concerned with training a policy model, called the actor, it also trains an action-value model, called the critic. The critic is used in service of training the actor and estimates the expected future discounted reward that would be received if a hypothetical action was selected under a current observation, and the actor's prescribed behavior was followed thereafter. Formally, the critic estimates the function Q, defined as $$Q(s,a) = E[\Sigma_{t=1}^{\infty} \gamma^{t-1} r_t | s, a, \pi] \qquad (1)$$

where $r_t$ is the reward received at timestep t, s is the current observation of the environment state, a is a hypothetical action, $\pi$ is the actor, and $\gamma$ is a discount factor in the domain [0, 1) that defines how valued future rewards are to more immediate ones.

DAC requires both the actor and critic to be implemented as a differentiable neural net. It also requires the actor to define a parametric stochastic policy. That means the output of the actor, $\pi(s)$, for a given observation (s) of the environment state, are the parameters of probability distributions over the domain of the action space. For discrete action spaces, these output parameters are typically probability mass values (or the log probability mass values); for continuous n-dimensional action spaces, the output parameters are often the mean and covariance of a multivariate Gaussian distribution over the action space.

DAC maintains a stale copy of both the actor and critic network. A stale model of some fresh model is a model that is initialized identically to the fresh model and is slowly moved, in a step-wise fashion, to match the fresh model as learning updates are performed on the fresh model. Assuming the fresh model converges to a fixed point, its stale model will converge to the same point, albeit the stale model, due to its slow movement toward the fresh model, can reach the fixed point of convergence at a time later than that of the fresh model.

The following notation is used herein, where s represents a minibatch of observations of the environment state;

a represents a minibatch of action selections that can be executed in the environment;

s' represents a minibatch of resulting observations of the environment state after some action is executed;

r represents a minibatch of scalar reward signal;

a' represents a minibatch of action selections that can be executed in the environment. This representation is used when an expression considers a second separate minibatch of actions in addition to a. For example, a' may refer to possible actions with respect to a resulting observation (s'), rather than the previous observation (s);

θ represents "fresh" critic neural net weights;

θ' represents "stale" critic neural net weights;

Q (s, a; θ) represents the critic estimate of the Q-values for the observation minibatch s when hypothetical action a is taken, using neural net weights θ;

φ represents "fresh" actor neural-net weights;

φ' represents "stale" actor neural-net weights;

π(s; φ) represents the action probability distribution parameters from the actor with weights φ for observation minibatch s;

π(s, a; φ) represents the probability densities of the actor with weights φ for selecting minibatch a when it observes minibatch s; and x~z represents a variable x is drawn from the distribution defined by distribution parameters z.

DAC has both an offline variant, in which it is trained using previously collected data, and an online variant, in which data is collected as DAC trains the actor.

The offline algorithm is shown in Algorithm 1, below. Algorithm 1 samples minibatches of (s, a, r, s') tuples from the available data, computes a critic loss ($L_Q$) and an actor loss ($L_\pi$), differentiates each loss with respect to the critic and actor neural-net parameters, performs a stochastic gradient-descent-based update (SGD) to the parameters, and then updates the stale neural-net parameters toward the new neural net parameters by a geometric coefficient (k). The method for sampling minibatches from the data may involve any number of sampling schemes, the most simple being to sample uniformly random minibatches from the data.

---
Algorithm 1 Offline DAC function DAC offline step (data, θ, φ, θ', φ', k, c)
  for c times do
    sample minibatch (s, a, r, s') from data
    estimate $L_Q$(s, a, r, s', θ, θ', φ')
    estimate $L\pi$(s, θ', φ)

compute $\frac{d}{d\theta} L_Q$

---
Algorithm 1 Offline DAC compute $\frac{d}{d\phi} L\pi$

OPTIMIZER_UPDATE $\left(\theta, \frac{d}{d\theta} L_Q\right)$

OPTIMIZER_UPDATE $\left(\phi, \frac{d}{d\phi} L\pi\right)$

Θ' ← (1 − k)θ' + kθ
    Φ' ← (1 − k) φ' + k φ
  end for
end function
function DAC_OFFLINE (data, θ, φ, k, c)
  θ' ← θ
  φ' ← φ
  DAC_OFFLINE_STEP (data, θ, φ, θ', φ', k, c)
end function

---

Central to the definition of DAC is the target of the loss functions, and how these loss functions are constructed for the discrete and continuous action cases. The target of a loss function is the optimal solution that minimizing the loss would produce. The target ($T_Q$) of the critic loss function for a given reward, and resulting observation is the scalar value:

$$T_Q(r,s') \triangleq r + \gamma E_{a' \sim \pi(s';\phi')}[Q(s',a',\theta')] \quad (2)$$

The target bootstraps the value from the next step using the stale actor and the stale critic. Because the actor defines a probability distribution over actions, the target ($T_\pi$) of the actor loss function is a probability distribution. Specifically, the target is the Boltzmann distribution over the Q-values from the stale critic in which the density for each action is defined as $$T_\pi(s, a) \triangleq \frac{\exp\left(\frac{1}{\tau} Q(s, a; \theta')\right)}{\int_{a'} \exp\left(\frac{1}{\tau} Q(s, a'; \theta')\right)} \quad (3)$$

In this definition τ is a "temperature" hyperparameter that defines how greedy the target distribution is towards the highest scoring Q-value. As the values approach 0, the distribution is more greedy; as it approaches infinity, the distribution becomes more uniform.

Using the Boltzmann distribution as the target prevents the actor from overfitting the current Q-value estimates in two ways. First, it prevents the policy from becoming deterministic, which would hinder exploration when used in the environment. Second, small errors in the Q-function estimate that overestimate a suboptimal action selection will not result in the actor optimization exploiting that small error. Instead, the action selection will be distributed across similar scoring actions that differ only because of small estimation errors.

Stochastic gradient-descent is a noisy process that requires many steps over many minibatches to converge to a target. DAC uses the slow-moving stale actor and critic in the respective targets to stabilize learning over the many required steps of optimization.

Furthermore, the use of stale models results in more stable policy improvement that is consistent with the classic policy iteration (PI) algorithm for tabular state and action spaces. In PI, an input policy is improved by two steps. First, the Q-values for the policy are evaluated exhaustively. Second, an improved policy is computed by finding the policy that maximizes the Q-values. PI repeats this improvement process on the newly improved policy until an optimal policy is found.

In DAC, the stale actor acts as the old policy to be evaluated by the fresh critic, and the stale critic provides the Q-values of an earlier policy on which the fresh actor improves.

For the discrete action case, the target for the critic ($T_Q$) can be computed exactly by marginalizing over the probability of each action selection by the stale actor. The loss function may then be represented using any norm of the difference between the critic and target. For the typical L2 norm case, the loss is $$L_Q(s,a,r,s',\theta,\theta',\emptyset')=(Q(s,a;\theta)-r-\gamma\Sigma_{a'}\pi(s',a';\emptyset')Q(s',a';\theta'))^2 \quad (4)$$

For the actor loss, the target distribution ($T_\pi$) can also be computed exactly, and the cross entropy loss function is used to make the actor match the target.

$$L_\pi(s, \theta', \emptyset) = \sum_a \log(\pi(s, a; \emptyset)) \frac{\exp\left(\frac{1}{\tau}Q(s, a, \theta')\right)}{\sum_{a'}\exp\left(\frac{1}{\tau}Q(s, a'; \theta')\right)} \quad (5)$$

Cross entropy is chosen because it allows for fast optimization toward discrete distributions. Because the target distribution is smooth across the Q-values, using the cross entropy loss will result in aggressive optimization that stops short of collapsing to a deterministic distribution, or one that erroneously exploits small errors.

In the continuous action case, the target of the critic and actor loss functions cannot be computed exactly, because there are an infinite number of actions. Instead, sampling from the actor and stale actor is used to stochastically approximate the targets. The variance from the sampling is smoothed by the stochastic gradient descent process.

The continuous-action critic loss looks much like the discrete-action critic loss, except it uses an action sample from the stale actor instead of marginalization.

$$a' \sim \pi(s';\emptyset')$$

$$L_Q(s,a,r,s',\theta,\theta',\emptyset')=(Q(s,a;\theta)-r-\gamma Q(s',a';\theta'))^2 \quad (6)$$

Two challenges for implementing the actor loss are (1) The Boltzmann distribution over continuous actions cannot be exactly computed; and (2) The parametric continuous probability distribution of the actor model may not be able to perfectly represent the continuous Boltzmann distribution.

To address these challenges, the KL divergence from the Boltzmann distribution to the actor distribution can be used as the loss function for the actor. Assuming the probability distribution of the actor may be sampled by re-parameterizing the actor into a deterministic function $f$ of the state and some externally sampled noise (E), the KL divergence loss can be stochastically estimated as $$\varepsilon \sim \text{noise function}$$

$$L_\pi(s,\theta',\emptyset')=\log(\pi(s;f(s,\varepsilon;\emptyset)))-Q(s,f(s,\varepsilon;\emptyset);\theta') \quad (7)$$

Many parametric continuous distributions allow for the actor to be re-parameterized to use externally sampled noise, including the common Gaussian distribution.

The online algorithm is defined using the offline algorithm step function and is shown in Algorithm 2.

---
Algorithm 2 Online DAC
---
function DAC_ONLINE (data, θ, ϕ, θ', ϕ', k, c)
   data ← empty dataset
   θ' ← θ
   ϕ' ← ϕ
   loop
      s ← env.observe( )
      a ~ π(s; ϕ)
      s', r ← env.execute(a)
      data.add((s, a, r, s'))
      DAC_OFFLINE_STEP (data, θ, ϕ, θ', ϕ', k, c)
   end loop
end function

---

The online algorithm takes the same hyperparameters as the offline algorithm, except instead of a dataset, it receives a reference to an environment with which it can interact. At the start, the agent constructs an initially empty dataset. It then repeats a series of interactions with the environment in which it observes the current state; selects and executes an action using the actor; observes the resulting state and reward; adds the transition to its dataset; and then runs the offline algorithm step.

In some contexts, an actor may have been previously trained using another learning paradigm (e.g., learning from demonstration), or have been hard coded by some means. In this case, DAC should improve on the state of the actor from where it left off. However, if the critic is a new model with randomly initialized parameters, then optimizing the actor model to maximize the random critic model will pull the actor back toward a more uniformly random policy. To address this issue, the online DAC algorithm is modified as shown in Algorithm 3.

---
Algorithm 3 Online DAC
---
function DAC_EVAL_STEP(data, θ, ϕ, θ', k, c):
   sample minibatch (s, a, r, s') from data
   estimate LQ(s, a, r, s', θ, θ', ϕ')
   compute d/dθ (L_Q)
   OPTIMIZER_UPDATE (θ, d/dθ (L_Q))
   Θ' ← (1 − k)θ' + kθ
end function
function DAC_ONLINE_IMPROVE(data, θ, ϕ, θ', ϕ', k, c, b)
   data ← empty dataset
   i ← 0
   θ' ← θ
   ϕ' ← ϕ
   loop
      s ← env.observe ( )
      a ~ π(s; ϕ)
      s', r ← env.execute (a)
      data.add ((s, a, r, s'))
      if i < b then
         DAC_EVAL_STEP(data, θ, ϕ', θ', k, c)
      else
         DAC_OFFLINE_STEP(data, θ, ϕ, θ', ϕ', k, c)
      end if
      i ← i + 1
   end loop
end function

---

This online improvement variant of DAC spends the first b steps training only the critic. After this burn-in period, the algorithm proceeds as online DAC (Algorithm 2) does.

Consequently, when updates to the actor begin, it will be using a meaningful evaluation of the actor on which to improve.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a sub combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A reinforcement learning algorithm for an agent, the algorithm comprising:
   using an action-value model for training a policy model, the action-value model estimating, within one or more processors of the agent, an expected future discounted reward that would be received if a hypothetical action was selected under a current observation of the agent and the agent's behavior was followed thereafter; and
   maintaining a stale copy of both the action-value model and the policy model, wherein the stale copy is initialized identically to a fresh copy of a fresh action-value model and a fresh policy model and is slowly moved to match the fresh copy as learning updates are performed on the fresh copy, wherein
   the stale copy of the policy model acts as an old policy to be evaluated by the fresh action-value model;
   the stale copy of the action-value model provides Q-values of an earlier policy model on which the fresh policy model improves; and
   the algorithm has both an offline variant, in which the algorithm is trained using previously collected data, and an online variant, in which data is collected as the algorithm trains the policy model.

2. The algorithm of claim 1, wherein the action-value model estimates the expected future discounted reward, Q, as $$Q(s,a) = E[\Sigma_{t=1}^{\infty} \gamma^{t-1} r_t | s, a, \pi],$$

where $r_t$ is a reward received at timestep t, s is the current observation of an environment state, a is the hypothetical action, $\pi$ is the policy model, and $\gamma$ is a discount factor in a domain [0, 1) that defines how valued future rewards are to more immediate rewards.

3. The algorithm of claim 1, wherein:
   the stale model converges to a same convergence point as the fresh model, albeit the stale model, due to its slow movement toward the fresh model, reaches the same convergence point at a time later than that of the fresh model.

4. The algorithm of claim 1, wherein an output of the policy model, $\pi(s)$, for a given observation (s) of an environment state, are parameters of probability distributions over a domain of an action space.

5. The algorithm of claim 4, wherein, when the action space is a discrete action space, the parameters outputted are probability mass values.

6. The algorithm of claim 4, wherein, when the action space is a continuous n-dimensional action space, the parameters outputted are a mean and a covariance of a multivariate Gaussian distribution over the action space.

7. The algorithm of claim 1, wherein the offline variant includes an offline algorithm comprising:
   sampling minibatches of tuples from available data;
   computing a critic loss function, $L_Q$, and an actor loss function, $L_\pi$;
   differentiating each of the critic loss function and the actor loss function with respect to neural-net parameters;
   performing a stochastic gradient-descent-based update to the neural-net parameters; and
   updating the stale copy toward the fresh copy by a geometric coefficient.

8. The algorithm of claim 7, wherein:
   for a discrete-action case, a target for the critic loss function is computed exactly by marginalizing over a probability of each action selection by the stale policy model; and
   for a discrete action case, a target for the actor loss is computed exactly and a cross entropy loss function is used to make the policy model match the target.

9. The algorithm of claim 7, wherein, for a continuous-action case, targets of the critic loss function and the actor loss function are not computed exactly, where sampling from the policy model and the stale copy of the policy model are used to stochastically approximate the targets, where a variance from the sampling is smoothed by a stochastic gradient descent process.

10. The algorithm of claim 7, wherein a target of each of the critic loss function and the actor loss function is an optimal solution that minimizing the respective critic loss function and the actor loss function would produce.

11. The algorithm of claim 7, wherein a target ($T_Q$) of the critic loss function for a given reward, and resulting observation is a scalar value defined by the formula—

$$T_Q(r,s') \triangleq r + \gamma E_{a' \sim \pi(s';\phi')}[Q(s',a',\theta')].$$

12. The algorithm of claim 7, wherein a target ($T_\pi$) of the actor loss function is a probability distribution over the Q-values from the stale copy of the action-value model in which a density for each action is defined as $$T_\pi(s, a) \triangleq \frac{\exp\left(\frac{1}{\tau}Q(s, a; \theta')\right)}{\int_{a'} \exp\left(\frac{1}{\tau}Q(s, a'; \theta')\right)},$$

wherein $\tau$ is a temperature hyperparameter that defines how greedy a target distribution is towards a highest scoring Q-value, where as the temperature hyperparameter approaches zero, the probability distribution is more greedy and as the temperature hyperparameter approaches infinity, the probability distribution becomes more uniform.

13. The algorithm of claim 12, wherein the probability distribution prevents the policy model from overfitting the Q-value estimate by (1) preventing the policy model from becoming deterministic, which would hinder exploration when used in the environment, and (2) preventing optimization of the policy model by exploiting a relatively small error in the Q-value estimate that overestimate a suboptimal action selection.

14. The algorithm of claim 1, wherein the agent is a previously trained agent and the action-value model is only used to train the agent over a predetermined number of initial steps.

15. A method of training a policy model and an action-value model of an agent, comprising:
estimating, within one or more processors of the agent by the action-value model, an expected future discounted reward that would be received if a hypothetical action was selected by the agent under a current observation of the agent and the agent's behavior was followed thereafter, the expected future discounted reward, Q, determined by $$Q(s,a)=E[\Sigma_{t=1}^\infty \gamma^{t-1} r_t | s, a, \pi],$$

where $r_t$ is a reward received at timestep t, s is the current observation of an environment state, a is the hypothetical action, $\pi$ is the policy model, and $\gamma$ is a discount factor in a domain [0, 1) that defines how valued future rewards are to more immediate rewards; and maintaining a stale copy of both the action-value model and the policy model, wherein the stale copy is initialized identically to the fresh copy and is moved step-wise to match the fresh copy as learning updates are performed on the fresh copy, wherein
the algorithm has both an offline variant, in which the algorithm is trained using previously collected data, and an online variant, in which data is collected as the algorithm trains the policy model;
the stale copy of the policy model acts as an old policy to be evaluated by the fresh copy of the action-value model critic; and
the stale copy of the action-value model provides Q-values of an earlier policy model on which a fresh policy model improves.

16. The method of claim 15, wherein:
an output of the policy model, $\pi(s)$, for a given observation (s) of an environment state, are parameters of probability distributions over a domain of an action space; and the action space is either a discrete action space or a continuous action space.

17. The method of claim 15, wherein the offline variant includes an offline algorithm comprising:
sampling minibatches of tuples from available data;
computing a critic loss function, $L_Q$, and an actor loss function, $L_\pi$;
differentiating each of the critic loss function and the actor loss function with respect to neural-net parameters;
performing a stochastic gradient-descent-based update to the neural-net parameters; and
updating the stale copy toward the fresh copy by a geometric coefficient.

18. The method of claim 17, wherein:
for a discrete-action case, (1) a target for the critic loss function is computed exactly by marginalizing over a probability of each action selection by the stale policy model, and (2) a target for the actor loss is computed exactly and a cross entropy loss function is used to make the policy model match the target; and
for a continuous-action case, targets of the critic loss function and the actor loss function are not computed exactly, where sampling from the policy model and the stale copy of the policy model are used to stochastically approximate the targets, where a variance from the sampling is smoothed by a stochastic gradient descent process.

19. A non-transitory computer-readable storage medium with an executable program stored thereon, wherein the program instructs one or more processors to perform the following steps:
using an action-value model for training a policy model, the action-value model estimating, within one or more processors of the agent, an expected future discounted reward that would be received if a hypothetical action was selected under a current observation of the agent and the agent's behavior was followed thereafter;
maintaining a stale copy of both the action-value model and the policy model, wherein the stale copy is initialized identically to a fresh copy of a fresh action-value model and a fresh policy model and is slowly moved to match the fresh copy as learning updates are performed on the fresh copy, wherein
the stale copy of the policy model acts as an old policy to be evaluated by the fresh action-value model;
the stale copy of the action-value model provides Q-values of an earlier policy model on which the fresh policy model improves; and
the algorithm has both an offline variant, in which the algorithm is trained using previously collected data, and an online variant, in which data is collected as the algorithm trains the policy model.

20. The non-transitory computer-readable storage medium with the executable program stored thereon according to claim 19, wherein:
the stale model converges to a same convergence point as the fresh model, albeit the stale model, due to its slow movement toward the fresh model, reaches the same convergence point at a time later than that of the fresh model.

* * * * *